United States Patent
Zhou

(10) Patent No.: US 10,567,506 B2
(45) Date of Patent: Feb. 18, 2020

(54) DATA STORAGE METHOD, SDN CONTROLLER, AND DISTRIBUTED NETWORK STORAGE SYSTEM

(71) Applicant: Huawei Technologies Co., Ltd., Shenzhen (CN)

(72) Inventor: Jingcai Zhou, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 454 days.

(21) Appl. No.: 15/391,127

(22) Filed: Dec. 27, 2016

(65) Prior Publication Data

US 2017/0111450 A1 Apr. 20, 2017

Related U.S. Application Data

(63) Continuation of application No. PCT/CN2015/074963, filed on Mar. 24, 2015.

(30) Foreign Application Priority Data

Aug. 15, 2014 (CN) .......................... 2014 1 0404901

(51) Int. Cl.
*G06F 15/167* (2006.01)
*H04L 29/08* (2006.01)
(Continued)

(52) U.S. Cl.
CPC .......... *H04L 67/1097* (2013.01); *G06F 3/067* (2013.01); *G06F 11/1448* (2013.01);
(Continued)

(58) Field of Classification Search
USPC .......................... 709/216, 213, 214, 215, 217
See application file for complete search history.

(56) References Cited

U.S. PATENT DOCUMENTS 7,779,137 B1 * 8/2010 Bali .................... H04L 41/0663
709/200
2003/0225899 A1 12/2003 Murphy
(Continued)

FOREIGN PATENT DOCUMENTS

| CN | 102024044 A | 4/2011 |
| CN | 102437925 A | 5/2012 |

(Continued)

OTHER PUBLICATIONS

Machine Translation and Abstract of Chinese Publication No. CN102024044, Apr. 20, 2011, 11 pages.
(Continued)

*Primary Examiner* — Lan Dai T Truong
(74) *Attorney, Agent, or Firm* — Conley Rose, P.C.

(57) ABSTRACT

A data storage solution in a distributed network storage system, where a metadata management node sends a backup mapping relationship of a destination data node to a controller, where the controller generates a first flow entry according to the backup mapping relationship of the destination data node, and sends the first flow entry to a switch, where the first flow entry includes an address of the destination data node and an address of a backup data node of the destination data node, and the switch broadcasts, to the destination data node and the backup date node according to the first flow entry, a write request sent by a client.

13 Claims, 4 Drawing Sheets

(51) Int. Cl.
*G06F 3/06* (2006.01)
*G06F 11/14* (2006.01)
*H04L 12/18* (2006.01)
*H04L 12/721* (2013.01)
*H04L 12/741* (2013.01)
*H04L 12/865* (2013.01)
*H04L 12/931* (2013.01)
*H04L 12/717* (2013.01)

(52) U.S. Cl.
CPC ......... *G06F 11/1464* (2013.01); *H04L 12/18* (2013.01); *H04L 29/08* (2013.01); *H04L 45/38* (2013.01); *H04L 45/745* (2013.01); *H04L 47/6275* (2013.01); *H04L 49/356* (2013.01); *G06F 2201/84* (2013.01); *H04L 45/42* (2013.01)

(56) References Cited

U.S. PATENT DOCUMENTS

| | | | | |
|---|---|---|---|---|
| 2005/0091333 | A1* | 4/2005 | Kobayashi | H04L 29/12169 709/212 |
| 2006/0271605 | A1* | 11/2006 | Petruzzo | G06F 16/21 |
| 2014/0029410 | A1 | 1/2014 | Kannan | |

FOREIGN PATENT DOCUMENTS

| | | |
|---|---|---|
| CN | 102594689 A | 7/2012 |
| CN | 102938794 A | 2/2013 |
| CN | 104135539 A | 11/2014 |
| EP | 2647165 A1 | 10/2013 |
| WO | 2012073406 A1 | 6/2012 |

OTHER PUBLICATIONS

Machine Translation and Abstract of Chinese Publication No. CN102437925, May 2, 2012, 11 pages.
Machine Translation and Abstract of Chinese Publication No. CN102594689, Jul. 18, 2012, 9 pages.
Machine Translation and Abstract of Chinese Publication No. CN102938794, Feb. 20, 2013, 14 pages.
Machine Translation and Abstract of Chinese Publication No. CN104135539, Nov. 5, 2014, 12 pages.
"OpenFlow Switch Specification," Part 1, Open Networking Foundation, Version 1.4.0 (Wire Protocol 0x05), ONF TS-012, Oct. 14, 2013, 102 pages.
"OpenFlow Switch Specification," Part 2, Open Networking Foundation, Version 1.4.0 (Wire Protocol 0x05), ONF TS-012, Oct. 14, 2013, 104 pages.
Foreign Communication From a Counterpart Application, European Application No. 15832259.4, Extended European Search Report dated May 29, 2017, 27 pages.
Foreign Communication From a Counterpart Application, Chinese Application No. 201410404901.7, Chinese Office Action dated Jan. 26, 2017, 10 pages.
Foreign Communication From a Counterpart Application, PCT Application No. PCT/CN2015/074963, English Translation of International Search Report dated Jun. 12, 2015, 2 pages.
Foreign Communication From a Counterpart Application, PCT Application No. PCT/CN2015/074963, English Translation of Written Opinion dated Jun. 12, 2015, 10 pages.

* cited by examiner

DATA STORAGE METHOD, SDN CONTROLLER, AND DISTRIBUTED NETWORK STORAGE SYSTEM

CROSS-REFERENCE TO RELATED APPLICATIONS

This application is a continuation of International Patent Application No. PCT/CN2015/074963 filed on Mar. 24, 2015, which claims priority to Chinese Patent Application No. 201410404901.7 filed on Aug. 15, 2014. The disclosures of the aforementioned applications are hereby incorporated by reference in their entireties.

TECHNICAL FIELD

Embodiments of the present disclosure relate to data communications technologies, and in particular, to a data storage method, an software-defined networking (SDN) controller, and a distributed network storage system.

BACKGROUND

A conventional storage system cannot meet a user requirement for massive data storage, and therefore a distributed storage system emerges. Although the distributed storage system can meet the user requirement, a network latency of the distributed storage system is relatively long. Consequently, the distributed storage system can be applied only to a latency-insensitive application scenario.

FIG. 1 is a schematic structural diagram of a distributed network storage system. As shown in FIG. 1, the distributed network storage system includes a metadata management node and multiple data nodes. The metadata management node manages a namespace of the distributed network storage system, for example, opening, closing, renaming a file or a directory, maintains mapping of a file path onto a data block, monitors heartbeats of the data nodes, and maintains a quantity of data block copies. The data nodes are used to manage data stored on their own nodes. Generally, a file is divided into one or more data blocks, and these data blocks are stored on a group of data nodes. To ensure high reliability of the distributed network storage system, at least one backup data node is disposed for each main data node. As shown in FIG. 1, a data node 1 is a main data node, and a data node 2 and a data node 3 are backup data nodes of the data node 1. A client first sends a data storage request to the metadata management node when the client write data, and the metadata management node returns metadata of the data to the client, where the metadata includes an address of a destination data node of the data, and the destination data node is the data node 1. The client first writes the data into the data node 1. Then, the data node 1 writes the data into the data node 2, and the data node 2 then writes the data into the data node 3. Then, the data node 3 returns an acknowledgement response to the data node 2, the data node 2 returns an acknowledgement response to the data node 1, and the data node 1 returns an acknowledgement response to the client. The client determines that the data is successfully written into the distributed network storage system when the client receives the acknowledgement response, and the client sends a file closing command to the metadata management node.

According to the foregoing descriptions, when a client writes data into a main data node, and the main data node writes the data into a backup data node, multiple times of network operations need to be performed, and a latency of one time of network operation is about 200 microseconds (μs). Therefore, a network latency of the distributed network storage system is relatively long.

SUMMARY

Embodiments of the present disclosure provide a data storage method, an SDN controller, and a distributed network storage system in order to reduce a latency in a data storage process.

A first aspect of the present disclosure provides a distributed network storage system, including a metadata management node, multiple data nodes, an SDN controller, and an SDN switch, where the metadata management node is connected to and communicates with the multiple data nodes using the SDN switch, the metadata management node is further connected to the SDN controller, the SDN controller is connected to the SDN switch, the multiple data nodes are in a mutual main-backup relationship, and each main data node corresponds to at least one backup data node. The metadata management node is configured to receive a data storage request sent by a client, and return metadata corresponding to to-be-written data to the client according to the data storage request, where the metadata includes an address of a destination data node for storing the to-be-written data, and the metadata management node is further configured to send a backup mapping relationship of the destination data node to the SDN controller. The SDN controller is configured to generate a first flow entry according to the backup mapping relationship of the destination data node sent by the metadata management node, and deliver the first flow entry to the SDN switch, where the first flow entry includes the address of the destination data node and an address of a backup data node of the destination data node, and the SDN switch is configured to receive a write request that is sent by the client according to the metadata, where the write request includes the to-be-written data and the address of the destination data node, and the SDN switch is further configured to search a flow table according to the address of the destination data node for the first flow entry that matches the address of the destination data node, and broadcast the write request to the destination data node and the backup data node according to the first flow entry, where the destination data node and the backup data node are separately configured to receive the write request broadcast by the SDN switch, and separately store the to-be-written data according to the write request.

With reference to the first aspect of the present disclosure, in a first possible implementation manner of the first aspect of the present disclosure, the address of the destination data node includes a network protocol Internet Protocol (IP) address and a port number of the destination data node, and the address of the backup data node includes an IP address and a port number of the backup data node.

With reference to the first aspect of the present disclosure and the first possible implementation manner of the first aspect of the present disclosure, in a second possible implementation manner of the first aspect of the present disclosure, the system further includes a resource management node, connected to the SDN switch and configured to obtain an address of the metadata management node, and send the address of the metadata management node to the SDN controller, where the SDN controller is further configured to generate a second flow entry according to the address of the metadata management node sent by the resource management node, and deliver the second flow entry to the SDN switch, where the second flow entry includes the address of the metadata management node. The SDN switch is further configured to search the flow table according to a destination address of the data storage request for the second flow entry that matches the destination address of the data storage request, add the data storage request to a highest priority queue according to the second flow entry, and send the data storage request to the metadata management node when the data storage request is received, where the destination address of the data storage request is the address of the metadata management node, and the SDN switch is further configured to search the flow table according to a source address of the metadata for the second flow entry that matches the source address of the metadata, add the data storage request to a highest priority queue according to the second flow entry, and send the metadata to the client when the metadata sent by the metadata management node is received, where the source address of the metadata is the address of the metadata management node.

With reference to the second possible implementation manner of the first aspect of the present disclosure, in a third possible implementation manner of the first aspect of the present disclosure, the address of the metadata management node includes an IP address and a port number of the metadata management node.

With reference to the first aspect of the present disclosure and the first to the third possible implementation manners of the first aspect of the present disclosure, in a fourth possible implementation manner of the first aspect of the present disclosure, the metadata management node is further configured to send, to the SDN controller, the changed backup mapping relationship of the destination data node when the backup mapping relationship of the destination data node is changed, and the SDN controller is further configured to update the first flow entry according to the changed backup mapping relationship of the destination data node sent by the metadata management node, and send an updated first flow entry to the SDN switch.

A second aspect of the present disclosure provides a data storage method, where the method is applied to a distributed network storage system, and the distributed network storage system includes a metadata management node, multiple data nodes, an SDN controller, and an SDN switch, where the multiple data nodes are in a mutual main-backup relationship, and each main data node corresponds to at least one backup data node, and the method includes receiving, by the SDN controller, a backup mapping relationship of a data node sent by the metadata management node, generating, by the SDN controller, a first flow entry according to the backup mapping relationship of the data node, where the first flow entry includes an address of a main data node and an address of a backup data node of the main data node, and the first flow entry is used to broadcast a matching data packet to the main data node and the backup data node, and sending, by the SDN controller, the first flow entry to the SDN switch.

With reference to the second aspect of the present disclosure, in a first possible implementation manner of the second aspect of the present disclosure, the address of the main data node includes a network protocol IP address and a port number of the main data node, and the address of the backup data node includes an IP address and a port number of the backup data node.

With reference to the second aspect of the present disclosure and the first possible implementation manner of the second aspect of the present disclosure, in a second possible implementation manner of the second aspect of the present disclosure, the distributed network storage system further includes a resource management node, and the resource management node is connected to the SDN switch, and the method further includes receiving, by the SDN controller, an address of the metadata management node sent by the resource management node, generating, by the SDN controller, a second flow entry according to the address of the metadata management node, where the second flow entry includes the address of the metadata management node, and the second flow entry is used to add a matching data packet to a highest priority queue, and sending, by the SDN controller, the second flow entry to the SDN switch.

With reference to the second possible implementation manner of the second aspect of the present disclosure, in a third possible implementation manner of the second aspect of the present disclosure, the address of the metadata management node includes an IP address and a port number of the metadata management node.

With reference to the second aspect of the present disclosure and the first possible implementation manner of the second aspect of the present disclosure, in a fourth possible implementation manner of the second aspect of the present disclosure, the method further includes receiving, by the SDN controller, a changed backup mapping relationship of the data node sent by the metadata management node, updating, by the SDN controller, the first flow entry according to the changed backup mapping relationship of the data node, and sending, by the SDN controller, an updated first flow entry to the SDN switch.

A third aspect of the present disclosure provides an SDN controller, where the SDN controller is applied to a distributed network storage system, and the distributed network storage system includes a metadata management node, multiple data nodes, the SDN controller, and an SDN switch, where the multiple data nodes are in a mutual main-backup relationship, and each main data node corresponds to at least one backup data node, and the SDN controller includes a receiving module configured to receive a backup mapping relationship of the data node sent by the metadata management node, a generation module configured to generate a first flow entry according to the backup mapping relationship of the data node, where the first flow entry includes an address of a main data node and an address of a backup data node of the main data node, and the first flow entry is used to broadcast a matching data packet to the main data node and the backup data node, and a sending module configured to send the first flow entry to the SDN switch.

With reference to the third aspect of the present disclosure, in a first possible implementation manner of the third aspect of the present disclosure, the address of the main data node includes a network protocol IP address and a port number of the main data node, and the address of the backup data node includes an IP address and a port number of the backup data node.

With reference to the third aspect of the present disclosure and the first possible implementation manner of the third aspect of the present disclosure, in a second possible implementation manner of the third aspect of the present disclosure, the distributed network storage system further includes a resource management node, where the resource management node is connected to the SDN switch, the receiving module is further configured to receive an address of the metadata management node sent by the resource management node. The generation module is further configured to generate a second flow entry according to the address of the metadata management node, where the second flow entry includes the address of the metadata management node, and the second flow entry is used to add a matching data packet to a highest priority queue, and the sending module is further configured to send the second flow entry to the SDN switch.

With reference to the second possible implementation manner of the third aspect of the present disclosure, in a third possible implementation manner of the third aspect of the present disclosure, the address of the metadata management node includes an IP address and a port number of the metadata management node.

With reference to the third aspect of the present disclosure and the first possible implementation manner of the third aspect of the present disclosure, in a fourth possible implementation manner of the third aspect of the present disclosure, the SDN controller further includes an update module, where the receiving module is further configured to receive a changed backup mapping relationship of the data node sent by the metadata management node, the update module is configured to update the first flow entry according to the changed backup mapping relationship of the data node, and the sending module is further configured to send an updated first flow entry to the SDN switch.

A fourth aspect of the present disclosure provides an SDN controller, where the SDN controller is applied to a distributed network storage system, and the distributed network storage system includes a metadata management node, multiple data nodes, the SDN controller, and an SDN switch, where the multiple data nodes are in a mutual main-backup relationship, and each main data node corresponds to at least one backup data node, and the SDN controller includes a processor and a memory, where the processor communicates with the memory, the memory stores computer-executable instructions, and the processor executes the computer-executable instructions, to execute the method provided in the second aspect of the present disclosure and the first to the fourth possible implementation manners of the second aspect.

According to a data storage method, an SDN controller, and a distributed network storage system provided in the embodiments of the present disclosure, a metadata management node sends a backup mapping relationship of a destination data node to an SDN controller in order to the SDN controller generates a first flow entry according to the backup mapping relationship of the destination data node, and delivers the first flow entry to an SDN switch, where the first flow entry includes an address of the destination data node and an address of a backup data node of the destination data node. The SDN switch broadcasts at a time, according to the first flow entry and to the destination data node and the backup data node, a write request sent by a client according to the metadata when the first flow entry is matched, thereby reducing an input/output (I/O) latency of storing to-be-written data that is in the write request from the destination data node to the backup data node.

BRIEF DESCRIPTION OF DRAWINGS

To describe the technical solutions in the embodiments of the present disclosure more clearly, the following briefly introduces the accompanying drawings required for describing the embodiments.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure.

Figure 1:
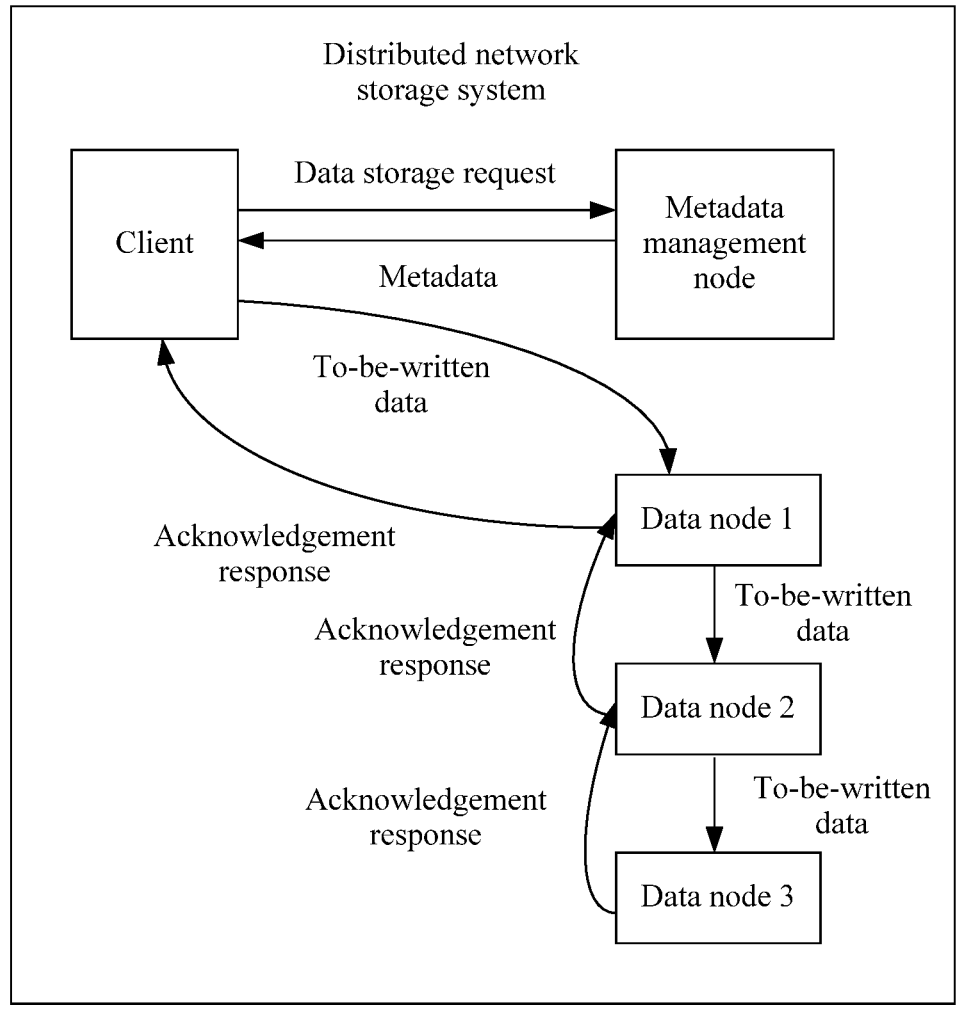
FIG. 1 is a schematic structural diagram of a distributed network storage system.
Figure 2:
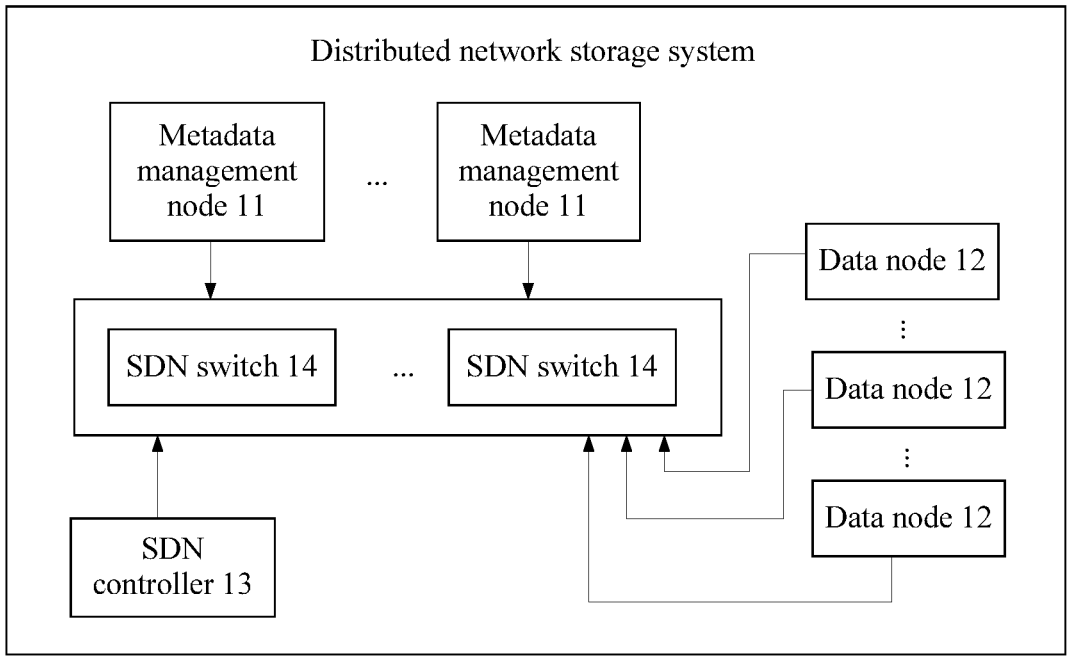
FIG. 2 is a schematic structural diagram of a distributed network storage system according to Embodiment 1 of the present disclosure.

FIG. 2 is a schematic structural diagram of a distributed network storage system according to Embodiment 1 of the present disclosure. As shown in FIG. 2, the distributed network storage system of this embodiment includes a metadata management node 11, multiple data nodes 12, an SDN controller 13, and an SDN switch 14. The metadata management node 11 communicates with the data nodes 12 using the SDN switch 14. The metadata management node 11 is further connected to the SDN controller 13. The SDN controller 13 is connected to the SDN switch 14. The multiple data nodes 12 are in a mutual main-backup relationship, and each main data node corresponds to at least one backup data node. The distributed network storage system may include multiple metadata management nodes 11 and multiple SDN switches 14.

The metadata management node 11 is configured to receive a data storage request sent by a client, and return metadata corresponding to to-be-written data to the client according to the data storage request, where the metadata includes an address of a destination data node for storing the to-be-written data. The metadata management node 11 is further configured to send a backup mapping relationship of the destination data node to the SDN controller 13.

The metadata management node 11 stores metadata. Metadata is data that describes data stored in a distributed network system and an environment of the data, and further describes which data is stored in a distributed network system and information about the data, such as a storage location, a size, and a namespace. The client first sends the data storage request to the metadata management node 11 when the client writes the to-be-written data into the distributed network storage system, and obtains the metadata corresponding to the to-be-written data. The client writes the to-be-written data into a data node according to the metadata. In this embodiment, the metadata includes the address of the destination data node for storing the to-be-written data. The destination data node is a main data node. The client sends a write request to the destination data node according to the address of the destination data node.

The metadata management node 11 is further configured to manage metadata, and further performs the following management on the metadata. A maintenance function, such as addition, deletion, and attribute modification of the metadata, a relationship maintenance function, such as establishing, deletion, and tracking of a relationship between the metadata, providing management on a metadata release process in order to better manage and track an entire life cycle of metadata, and functions such as metadata quality verification, metadata query, metadata statistics collection, analysis of metadata use, metadata change, and management on a metadata version and life cycle.

The metadata management node 11 is further configured to control a backup mapping relationship of all data nodes 12. All data nodes 12 in the distributed network storage system are in the mutual main-backup relationship. That is, a main data node and a backup data node are relative, and should not be considered as absolute role assignment. For example, for some data, a data node A is a main data node, and a data node B is a backup data node, while for some other data, the data node A is a backup data node, and the data node B is a main data node.

The SDN controller 13 is configured to generate a first flow entry according to the backup mapping relationship of the destination data node sent by the metadata management node 11, and deliver the first flow entry to the SDN switch 14, where the first flow entry includes the address of the destination data node and an address of a backup data node of the destination data node.

The SDN controller 13 is configured to generate a corresponding first flow entry for each main data node according to the backup mapping relationship of all the data nodes 12 sent by the metadata management node 11, where the first flow entry includes an address of a main data node and an address of a backup data node of the main data node. The address of the main data node may include an IP address and a port number of the main data node, and the address of the backup data node may include an IP address and a port number of the backup data node. The address of the main data node may also include only the IP address of the main data node, and the address of the backup data node may also include only the IP address of the backup data node. The metadata management node 11 may send the backup mapping relationship of all the data nodes 12 to the SDN controller 13 according to a backup mapping table of data nodes 12. The backup mapping table of the data nodes 12 is shown in Table 1.

TABLE 1

| No. | Main data node | Backup data node 1 | Backup data node 2 |
|---|---|---|---|
| 1 | 192.168.1.1:3000 | 192.168.1.2:3000 | 192.168.1.3:3000 |
| 2 | 192.168.2.1:3000 | 192.168.2.2:3000 | 192.168.2.3:3000 |
| 3 | 192.168.3.1:3000 | 192.168.3.2:3000 | 192.168.3.3:3000 |

In Table 1, there are three main data nodes in total and their numbers are 1, 2, and 3 respectively. Each main data node has two backup data nodes. For the main data node 1, an IP address is 192.168.1.1, and a port number is 3000. For the backup data node 1 of the main data node 1, an IP address is 192.168.1.2, and a port number is 3000. For the backup data node 2 of the main data node 1, an IP address is 192.168.1.3, and a port number is 3000. An OPENFLOW flow table generated by the SDN controller 13 according to Table 1 is shown in Table 2. A flow table includes multiple flow table entries. Each flow entry includes three parts, a rule, an action, and a status. The rule is used to define a matching rule of a flow. The action instructs to perform forwarding, discarding, and another action on a data stream. The status is used to collect traffic statistics.

TABLE 2

| No. | Rule | Action | Status |
|---|---|---|---|
| 1 | IP = 192.168.1.1<br>Port = 3000 | Automatically broadcast a packet to:<br>192.168.1.2:3000 and<br>192.168.1.3:3000 | XXXX |
| 2 | IP = 192.168.2.1<br>Port = 3000 | Automatically broadcast a packet to:<br>192.168.2.2:3000 and<br>192.168.2.3:3000 | XXXX |
| 3 | IP = 192.168.3.1<br>Port = 3000 | Automatically broadcast a packet to:<br>192.168.3.2:3000 and<br>192.168.3.3:3000 | XXXXX |

Table 2 includes three first flow entries. Each first flow entry corresponds to a backup mapping relationship in Table 1. Using the first flow entry 1 as an example, the rule of the first flow entry 1 is matching a data packet whose IP=192.168.1.1 and Port=3000. When a data packet that matches the rule is received, the SDN switch 14 executes the corresponding action to broadcast the data packet to 192.168.1.2:3000, 192.168.1.3:3000, and 192.168.1.1:3000. The data packet that matches the rule is a data packet whose destination IP address is 192.168.1.1 and port number is 3000. In the first flow entry 1, 192.168.1.1:3000 is an address of a main data node, 192.168.1.2:3000 and 192.168.1.3:3000 are addresses of backup data nodes respectively. Therefore, to-be-written data can be broadcast to a main data node and a backup data node at a time according to a first flow entry. It should be noted that, in Table 2, an action item of each first flow entry instructs to forward a matching data packet to a backup data node, but an address of a main data node is omitted. A destination address of a data packet is the address of the main data node, and therefore even if in the action item, the address of the main data node is omitted, an SDN switch 14 may also broadcast the data packet to both the main data node and the backup data node. Certainly, the action item may also include the address of the main data node.

The SDN switch 14 is configured to receive the write request that is sent by the client according to the metadata. The write request includes the to-be-written data and the address of the destination data node. The SDN switch 14 is further configured to search a flow table according to the address of the destination data node for the first flow entry that matches the address of the destination data node, and broadcast the write request to the destination data node and the backup data node according to the first flow entry.

After the metadata of the to-be-written data is obtained from the metadata management node 11, the client sends the write request to the destination data node according to the metadata, where the write request is used to write the to-be-written data into data nodes 12 according to the metadata. Further, the client sends the write request to the destination data node according to the address of the destination data node for storing the to-be-written data and that is included in the metadata, where the write request includes the to-be-written data, and a destination address of the write request is the address of the destination data node. The write request is finally sent to the destination data node using multiple SDN switches 14. When the SDN switch 14 receives the write request, the SDN switch 14 searches a flow table according to the address of the destination data node in the write request for the first flow entry that matches the address of the destination data node. An action of the first flow entry instructs to broadcast a matching data packet to the destination data node and the backup data node of the destination data node. Therefore, the SDN switch 14 broadcasts the write request to the destination data node and the backup data node according to the matching first flow entry.

In other approaches, when a main data node has n backup data nodes, a switch needs to perform n times of data forwarding to forward a write request to all backup data nodes. However, in this embodiment, the SDN switch broadcasts the write request to the main data node and n backup data nodes at a time, therefore, an I/O operation latency of writing data can be reduced.

The destination data node and the backup data node are separately configured to receive the write request broadcast by the SDN switch 14, and separately store the to-be-written data according to the write request.

In this embodiment, a metadata management node 11 sends a backup mapping relationship of a destination data node to an SDN controller 13 in order to the SDN controller 13 generates a first flow entry according to the backup mapping relationship of the destination data node, and delivers the first flow entry to an SDN switch 14, where the first flow entry includes an address of the destination data node and an address of a backup data node of the destination data node, and the SDN switch 14 broadcasts a write request to the destination data node and the backup data node at a time according to the first flow entry when the first flow entry is matched, thereby reducing an I/O latency of storing to-be-written data from the destination data node to the backup data node.

Based on the foregoing Embodiment 1, optionally, in a feasible implementation manner of the present disclosure, the metadata management node 11 is further configured to send, to the SDN controller 13, a changed backup mapping relationship of the destination data node when the backup mapping relationship of the destination data node is changed. Correspondingly, the SDN controller 13 is further configured to update the first flow entry according to the changed backup mapping relationship of the destination data node sent by the metadata management node 11, and send an updated first flow entry to the SDN switch 14. The SDN switch 14 forwards data according to the updated first flow entry.

Figure 3:
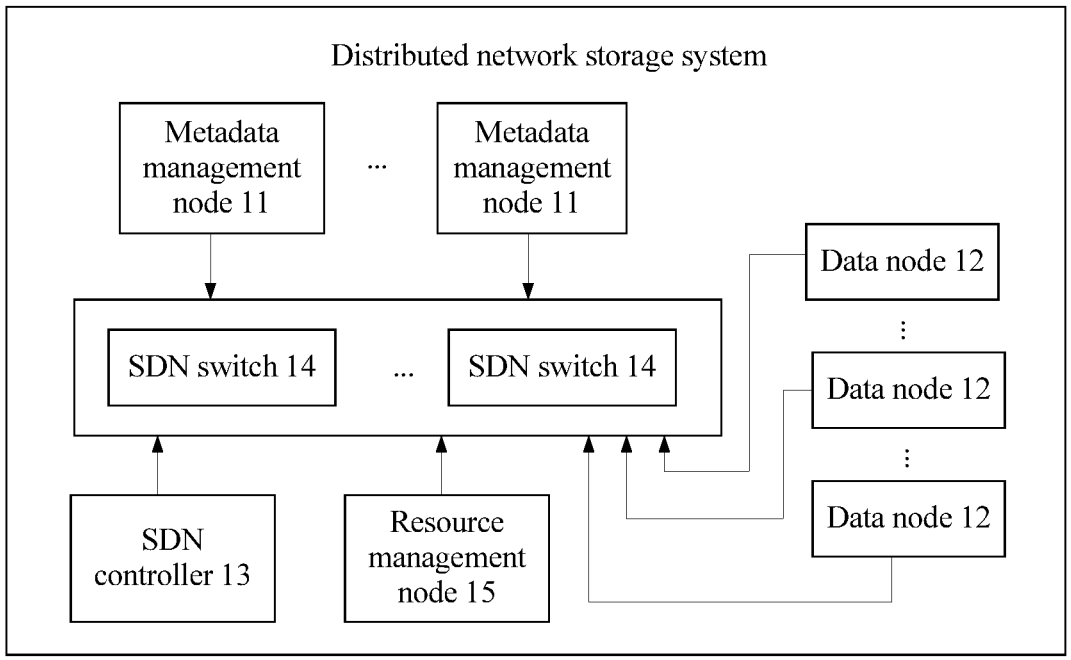
FIG. 3 is a schematic structural diagram of a distributed network storage system according to Embodiment 2 of the present disclosure.

In a distributed network storage system, times of access to metadata account for approximately 80% of a total quantity of times of access to the distributed network storage system. Therefore, preferentially ensuring network service quality of the metadata plays a crucial role in improving performance of the distributed network storage system. Embodiment 2 of the present disclosure provides a distributed network storage system. The distributed network storage system in this embodiment can ensure that metadata is preferentially processed, thereby reducing a latency of processing the metadata. FIG. 3 is a schematic structural diagram of the distributed network storage system according to Embodiment 2 of the present disclosure. As shown in FIG. 3, compared with the distributed network storage system in Embodiment 1, the distributed network storage system in this embodiment is provide with a resource management node 15.

The resource management node 15 is connected to an SDN switch 14, and is configured to obtain an address of a metadata management node 11, and send the address of the metadata management node 11 to an SDN controller 13.

The resource management node 15 is generally configured to manage a storage resource of a distributed network storage system, for example, to configure a logical unit number (LUN), to assign a LUN, to add or delete a data node, or to manage a metadata management node 11. In this embodiment, the resource management node 15 is configured to obtain addresses of all metadata management nodes 11, and send the addresses of all the metadata management nodes 11 to the SDN controller 13. An address of a metadata management node 11 may include an IP address and a port number of the metadata management node 11.

The SDN controller 13 is further configured to generate a second flow entry according to the address of the metadata management node 11 sent by the resource management node 15, and deliver the second flow entry to each SDN switch 14, where the second flow entry includes the address of the metadata management node 11.

As shown in Table 3, Table 3 is a schematic diagram of a second flow entry. A second flow entry also includes a rule, an action, and a status. The rule of the second flow entry is an IP address and a port number of a metadata management node 11. The action of the second flow entry instructs to add a matching data packet to a highest priority queue. An SDN switch 14 adds, to the highest priority queue according to the second flow entry, a data packet to be sent to a metadata management node 11 or a data packet sent from a metadata management node 11, and forwards the forgoing data packets.

TABLE 3

| No. | Rule | Action | Status |
| --- | --- | --- | --- |
| 1 | IP = An IP address of a metadata management node 1 Port = XXXX | Add a data packet to a highest priority queue | XXXX |
| 2 | IP = An IP address of a metadata management node 2 Port = XXXX | Add a data packet to a highest priority queue | XXXX |
| 3 | ... | | |

Correspondingly, in this embodiment, the SDN switch 14 is further configured to search a flow table according to a destination address of the data storage request for the second flow entry that matches the destination address of the data storage request when a data storage request is received, add the data storage request to a highest priority queue according to the second flow entry, and send the data storage request to the metadata management node 11, where the destination address of the data storage request is the address of the metadata management node 11.

The SDN switch 14 is further configured to search a flow table according to a source address of the metadata for the second flow entry that matches the source address of the metadata when metadata sent by the metadata management node 11 is received, add the metadata to the highest priority queue according to the second flow entry, and send the metadata to a client, where the source address of the metadata is the address of the metadata management node 11.

All data sent between the client and the metadata management node 11 needs to be forwarded by the SDN switch 14. When a data packet is received, the SDN switch 14 searches a flow table according to a source address of the data packet and a destination address of the data packet. Provided that either of the source address of the data packet or the destination address of the data packet matches a rule of the second flow entry, the SDN switch 14 adds the data packet to the highest priority queue and performs processing. When the source address of the data packet matches the rule of the second flow entry, it indicates that the data packet is sent from the metadata management node 11. When the destination address of the data packet matches the rule of the second flow entry, it indicates that the data packet is sent to the metadata management node 11.

In this embodiment, when the client sends the data storage request to the metadata management node 11, the SDN switch 14 receives the data storage request, where the destination address of the data storage request is the address of the metadata management node 11. The SDN switch 14 searches the flow table for the second flow entry that matches the destination address of the data storage request, where an action of the second flow entry instructs to add a data packet to a highest priority queue. Therefore, the SDN switch 14 adds the data storage request to the highest priority queue, and forwards the data storage request to the metadata management node 11. The source address of the metadata is the address of the metadata management node 11 when the metadata management node 11 returns the metadata to the client according to the data storage request. The SDN switch 14 searches the flow table for the second flow entry that matches the source address of the metadata, where an action of the second flow entry instructs to add a data packet to a highest priority queue. Therefore, the SDN switch 14 adds the metadata to the highest priority queue, and forwards the metadata to the client.

In this embodiment, a resource management node 15 sends an address of a metadata management node 11 to an SDN controller 13. The SDN controller 14 generates a second flow entry according to the address of the metadata management node 11, where a matching rule of the second flow entry is the address of the metadata management node 11, and an action item is adding a matching data packet to a highest priority queue, an SDN switch 14 forwards a data packet sent to the metadata management node 11 and metadata returned by the metadata management node 11, thereby ensuring that a metadata access request can be processed in a timely manner and improving response sensitivity of a distributed network storage system.

Figure 4:
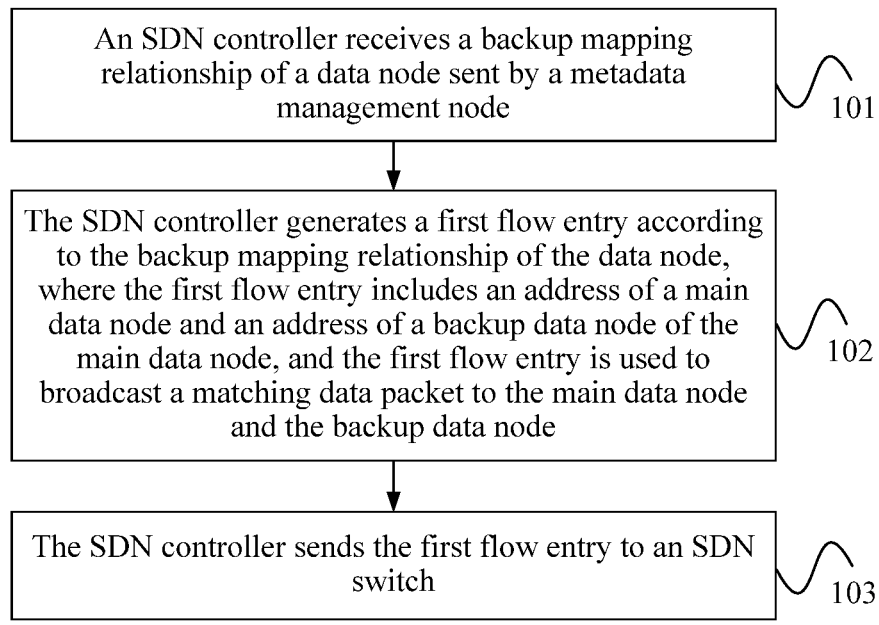
FIG. 4 is a flowchart of a data storage method according to Embodiment 3 of the present disclosure.

FIG. 4 is a flowchart of a data storage method according to Embodiment 3 of the present disclosure. The method in this embodiment may be applied to the distributed network storage systems shown in FIG. 2 and FIG. 3. As shown in FIG. 4, the method in this embodiment may include the following steps.

Step 101: An SDN controller receives a backup mapping relationship of a data node sent by a metadata management node.

The metadata management node is responsible for managing a backup mapping relationship of all data nodes in the distributed network storage system.

Step 102: The SDN controller generates a first flow entry according to the backup mapping relationship of the data node, where the first flow entry includes an address of a main data node and an address of a backup data node of the main data node, and the first flow entry is used to broadcast a matching data packet to the main data node and the backup data node.

The address of the main data node may include an IP address and a port number of the main data node. The address of the backup data node may include an IP address and a port number of the backup data node. For a specific process in which the SDN controller generates the first flow entry according to the backup mapping relationship of the data node and a composition structure of the first flow entry, reference may be made to related descriptions in Embodiment 1, and details are not described herein.

Step 103: The SDN controller sends the first flow entry to an SDN switch.

The SDN controller sends the first flow entry to the SDN switch in order to the SDN switch broadcasts, according to the first flow entry, a write request that matches the first flow entry to the main data node and the backup data node.

In this embodiment, an SDN controller generates a first flow entry according to a backup mapping relationship of a data node sent by a metadata management node, where the first flow entry includes an address of a main data node and an address of a backup data node of the main data node, and sends the first flow entry to an SDN switch in order to the SDN switch broadcasts a write request of a client to the main data node and the backup data node according to the first flow entry. Because the SDN switch broadcasts the write request to both the main data node and the backup data node, an I/O latency of storing to-be-written data from the main data node to the backup data node is reduced.

Based on Embodiment 3, when the backup mapping relationship of the data node is changed, the method may further include the following steps. The SDN controller receives the changed backup mapping relationship of the data node sent by the metadata management node, then, the SDN controller updates the first flow entry according to the changed backup mapping relationship of the data node, and sends an updated first flow entry to the SDN switch.

Figure 5:
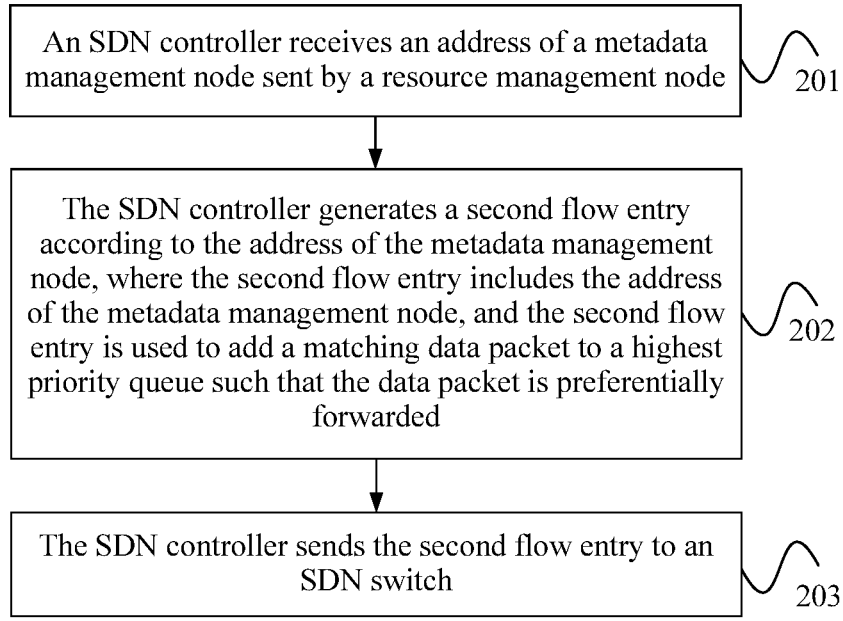
FIG. 5 is a flowchart of a data storage method according to Embodiment 4 of the present disclosure.

FIG. 5 is a flowchart of a data storage method according to Embodiment 4 of the present disclosure. As shown in FIG. 5, the method in this embodiment may include the following steps.

Step 201: An SDN controller receives an address of a metadata management node sent by a resource management node.

The resource management node manages a resource in a distributed network storage system, including managing the metadata management node. In this embodiment, the resource management node obtains the address of the metadata management node, and sends the obtained address of the metadata management node to the SDN controller, where the address of the metadata management node may be an IP address and a port number of the metadata management node.

Step 202: The SDN controller generates a second flow entry according to the address of the metadata management node, where the second flow entry includes the address of the metadata management node, and the second flow entry is used to add a matching data packet to a highest priority queue such that the data packet is preferentially forwarded.

For a specific manner of generating, by the SDN controller, the second flow entry according to the address of the metadata management node and a schematic diagram of composition of the second flow entry, reference may be made to related descriptions in Embodiment 2, and details are not described herein.

Step 203: The SDN controller sends the second flow entry to an SDN switch.

The SDN controller sends the second flow entry to the SDN switch in order to the SDN switch adds a matching data packet to the highest priority queue according to the second flow entry and forwards the data packet.

When performing matching on the second flow entry, the SDN switch may perform matching according to a source IP address and a source port number of a received data packet, and perform matching according to a destination IP address and a destination port number of the received data packet. The destination IP address and the destination port number of the data packet are the IP address and the port number of the metadata management node when the data packet is sent from a client to the metadata management node. The data packet is successfully matched, and the SDN switch adds the data packet to the highest priority queue, and forwards the data packet to the metadata management node, thereby ensuring that a metadata access request can be processed in a timely manner. The source IP address and the source port number of the data packet are the IP address and the port number of the metadata management node when the data packet is sent from the metadata management node to a client. The data packet is successfully matched, and the SDN switch adds the data packet to the highest priority queue, and sends the data packet to the client, thereby ensuring that metadata is processed in a timely manner and improving response sensitivity of a distributed network storage system.

Figure 6:
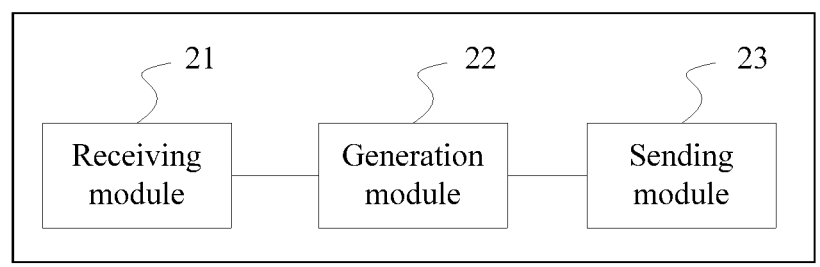
FIG. 6 is a schematic structural diagram of an SDN controller according to Embodiment 5 of the present disclosure.

FIG. 6 is a schematic structural diagram of an SDN controller according to Embodiment 5 of the present disclosure. As shown in FIG. 6, the SDN controller provided in this embodiment includes a receiving module 21, a generation module 22, and a sending module 23.

The receiving module 21 is configured to receive a backup mapping relationship of a data node sent by a metadata management node.

A generation module 22 is configured to generate a first flow entry according to the backup mapping relationship of the data node, where the first flow entry includes an address of a main data node and an address of a backup data node of the main data node, and the first flow entry is used to broadcast a matching data packet to the main data node and the backup data node.

The sending module 23 is configured to send the first flow entry to an SDN switch.

The address of the main data node includes a network protocol IP address and a port number of the main data node. The address of the backup data node includes an IP address and a port number of the backup data node.

Optionally, the receiving module 21 is further configured to receive an address of the metadata management node sent by the resource management node. Correspondingly, the generation module 22 is further configured to generate a second flow entry according to the address of the metadata management node, where the second flow entry includes the address of the metadata management node, and the second flow entry is used to add a matching data packet to a highest priority queue. The sending module 23 is further configured to send the second flow entry to the SDN switch. The address of the metadata management node includes an IP address and a port number of the metadata management node.

Optionally, the SDN controller further includes an update module (not shown) configured to update the first flow entry according to a changed backup mapping relationship of the data node. Correspondingly, the receiving module 21 is further configured to receive the changed backup mapping relationship of the data node is sent by the metadata management node.

The SDN controller in this embodiment may be configured to execute the technical solutions provided in Embodiment 3 and Embodiment 4. Specific implementation manners and technical effects are similar, and details are not described herein.

Figure 7:
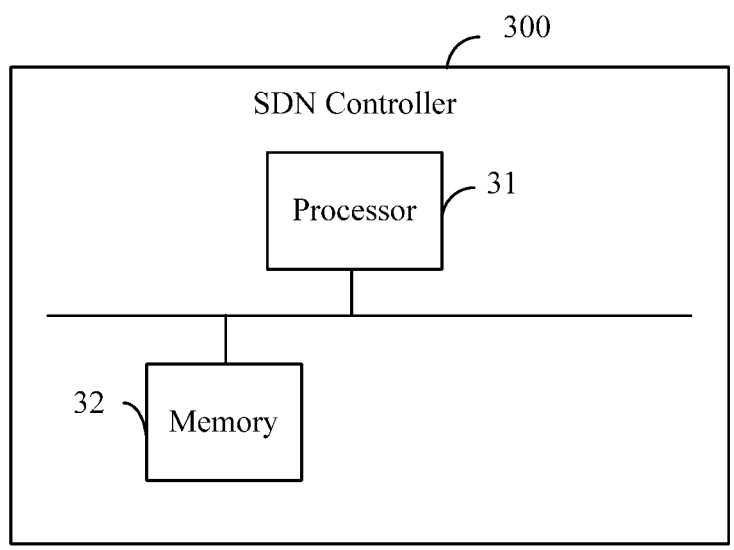
FIG. 7 is a schematic structural diagram of an SDN controller according to Embodiment 6 of the present disclosure.

FIG. 7 is a schematic structural diagram of an SDN controller according to Embodiment 6 of the present disclosure. As shown in FIG. 7, the SDN controller 300 in this embodiment includes a processor 31 and a memory 32. The processor 31 is connected to and communicates with the memory 32, and the memory 32 stores computer-executable instructions. When the SDN controller 300 works, the processor 31 and the memory 32 communicate with each other, and the processor 31 executes the computer-executable instructions, to enable the SDN controller 300 to execute the following method which includes the operations of receiving a backup mapping relationship of a data node sent by a metadata management node, and generating a first flow entry according to the backup mapping relationship of the data node, where the first flow entry includes an address of a main data node and an address of a backup data node of the main data node, and the first flow entry is used to broadcast a matching data packet to the main data node and the backup data node, and sending the first flow entry to an SDN switch.

Optionally, the address of the main data node includes a network protocol IP address and a port number of the main data node. The address of the backup data node includes an IP address and a port number of the backup data node.

To ensure that metadata is preferentially processed to improve a response speed of a distributed network storage system, the processor 31 further executes receiving an address of the metadata management node sent by a resource management node, generating a second flow entry according to the address of the metadata management node, where the second flow entry includes the address of the metadata management node, and the second flow entry is used to add a matching data packet to a highest priority queue, and sending the second flow entry to the SDN switch. Optionally, the address of the metadata management node includes an IP address and a port number of the metadata management node.

Further, the processor 31 further executes receiving a changed backup mapping relationship of the data node sent by the metadata management node, updating the first flow entry according to the changed backup mapping relationship of the data node, and sending an updated first flow entry to the SDN switch.

The SDN controller provided in this embodiment may be configured to execute the technical solutions provided in Embodiment 3 and Embodiment 4. Specific implementation manners and technical effects are similar, and details are not described herein.

Persons of ordinary skill in the art may understand that all or some of the steps of the method embodiments may be implemented by a program instructing relevant hardware. The program may be stored in a nonvolatile computer-readable storage medium. The steps of the method embodiments are performed when the program runs. The foregoing storage medium includes any medium that can store program code, such as a read-only memory (ROM), a magnetic disk, or an optical disc.

What is claimed is:

1. A distributed network storage system, comprising:
a switch;
a controller connected to the switch and comprising a memory and a processor coupled to the memory;
data nodes;
a metadata management node connected to the controller and communicates with the data nodes using the switch and configured to:
receive a data storage request sent by a client;
return metadata corresponding to to-be-written data to the client according to the data storage request, wherein the metadata comprises an address of a destination data node for storing the to-be-written data, wherein the destination data node is one of the data nodes; and
send a backup mapping relationship of the destination data node to the controller, wherein the backup mapping relationship indicates a backup data node of the destination data node, and wherein the backup data node is one of the data nodes, wherein the controller is configured to:
  generate a first flow entry according to the backup mapping relationship of the destination data node sent by the metadata management node; and
  deliver the first flow entry to the switch, wherein the first flow entry comprises the address of the destination data node and an address of the backup data node of the destination data node, wherein the switch is configured to:
  receive a write request that is sent by the client according to the metadata, wherein the write request comprises the to-be-written data and the address of the destination data node;
  search a flow table according to the address of the destination data node for the first flow entry that matches the address of the destination data node; and
  broadcast the write request to the destination data node and the backup data node according to the first flow entry, and wherein the destination data node and the backup data node are separately configured to:
  receive the write request broadcast by the switch; and
  separately store the to-be-written data according to the write request.

2. The distributed network storage system according to claim 1, wherein the address of the destination data node comprises an Internet Protocol (IP) address and a port number of the destination data node, and wherein the address of the backup data node comprises an IP address and a port number of the backup data node.

3. The distributed network storage system according to claim 1, further comprising a resource management node connected to the switch and configured to:
  obtain an address of the metadata management node; and
  send the address of the metadata management node to the controller, wherein the controller is further configured to:
  generate a second flow entry according to the address of the metadata management node sent by the resource management node; and
  deliver the second flow entry to the switch, wherein the second flow entry comprises the address of the metadata management node, and wherein the switch is further configured to:
  search the flow table according to a destination address of the data storage request for the second flow entry that matches the destination address of the data storage request when the data storage request is received;
  add the data storage request to a highest priority queue according to the second flow entry;
  send the data storage request to the metadata management node, wherein the destination address of the data storage request is the address of the metadata management node;
  search the flow table according to a source address of the metadata for the second flow entry that matches the source address of the metadata when the metadata sent by the metadata management node is received;
  add the metadata to the highest priority queue according to the second flow entry; and
  send the metadata to the client, wherein the source address of the metadata is the address of the metadata management node.

4. The distributed network storage system according to claim 3, wherein the address of the metadata management node comprises an IP address and a port number of the metadata management node.

5. The distributed network storage system according to claim 1, wherein the metadata management node is further configured to send, to the controller, a changed backup mapping relationship of the destination data node when the backup mapping relationship of the destination data node is changed, and wherein the controller is further configured to:
  update the first flow entry according to the changed backup mapping relationship of the destination data node sent by the metadata management node; and
  send an updated first flow entry to the switch.

6. A data storage method applied to a distributed network storage system, wherein the distributed network storage system comprises a metadata management node, data nodes, a controller, a switch, and a resource management node connected to the switch, and wherein the method comprises:
  receiving, by the controller, and from the metadata management node, a backup mapping relationship of a destination data node and a backup data node of the destination data node, wherein the destination data node is one of the data nodes, and wherein the backup data node is one of the data nodes;
  generating, by the controller, a first flow entry according to the backup mapping relationship, wherein the first flow entry comprises an address of the destination data node and an address of the backup data node, and wherein the first flow entry is used to broadcast a matching data packet to the destination data node and the backup data node;
  sending, by the controller, the first flow entry to the switch;
  receiving, by the controller, an address of the metadata management node sent by the resource management node;
  generating, by the controller, a second flow entry according to the address of the metadata management node, wherein the second flow entry comprises the address of the metadata management node, and wherein the second flow entry is used to add the matching data packet to a highest priority queue; and
  sending, by the controller, the second flow entry to the switch.

7. The method according to claim 6, wherein the address of the destination data node comprises an Internet Protocol (IP) address and a port number of the destination data node, and wherein the address of the backup data node comprises an IP address and a port number of the backup data node.

8. The method according to claim 6, wherein the address of the metadata management node comprises an IP address and a port number of the metadata management node.

9. The method according to claim 6, further comprising:
  receiving, by the controller, a changed backup mapping relationship by the metadata management node;
  updating, by the controller, the first flow entry according to the changed backup mapping relationship; and
  sending, by the controller, an updated first flow entry to the switch.

10. A controller in a distributed network storage system, wherein the distributed network storage system comprises a metadata management node, data nodes, the controller, and a switch, and wherein the controller comprises:
  an interface configured to receive a backup mapping relationship of a data node sent by the metadata management node; and a processor coupled to the interface and configured to:
   generate a first flow entry according to the backup mapping relationship of the data node; and
   send the first flow entry to the switch, wherein the first flow entry comprises an address of a destination data node and an address of a backup data node of the destination data node, wherein the first flow entry is used to broadcast a matching data packet to the destination data node and the backup data node, wherein the backup data node is one of the data nodes, and wherein the destination data node is one of the data nodes,
wherein the interface is further configured to receive a changed backup mapping relationship of the destination data node sent by the metadata management node, and
wherein the processor is further configured to:
   update the first flow entry according to the changed backup mapping relationship of the destination data node; and
   send an updated first flow entry to the switch.

11. The controller according to claim 10, wherein the address of the destination data node comprises an Internet Protocol (IP) address and a port number of the destination data node, and wherein the address of the backup data node comprises an IP address and a port number of the backup data node.

12. The controller according to claim 10, wherein the distributed network storage system further comprises a resource management node connected to the switch, wherein the interface is further configured to receive an address of the metadata management node sent by the resource management node, and wherein the processor is further configured to:
   generate a second flow entry according to the address of the metadata management node; and
   send the second flow entry to the switch, wherein the second flow entry comprises the address of the metadata management node, and wherein the second flow entry is used to add the matching data packet to a highest priority queue.

13. The controller according to claim 12, wherein the address of the metadata management node comprises an IP address and a port number of the metadata management node.

* * * * *